United States Patent [19]
Bogen

[11] Patent Number: 5,125,678
[45] Date of Patent: Jun. 30, 1992

[54] FOLDING BICYCLE

[76] Inventor: Ulrich Bogen, Veitsbronnerstr. 5, 8522 Herzogenaurach, Fed. Rep. of Germany

[21] Appl. No.: 793,328
[22] PCT Filed: Jan. 21, 1988
[86] PCT No.: PCT/DE88/00030
§ 371 Date: Jul. 3, 1989
§ 102(e) Date: Jul. 3, 1989
[87] PCT Pub. No.: WO88/05394
PCT Pub. Date: Jul. 28, 1988

Related U.S. Application Data

[63] Continuation of Ser. No. 631,752, Dec. 21, 1990, abandoned, which is a continuation of Ser. No. 392,960, Jul. 3, 1989, abandoned.

[30] Foreign Application Priority Data

Jan. 22, 1987 [DE] Fed. Rep. of Germany ....... 3701803

[51] Int. Cl.$^5$ .............................................. B62K 15/00
[52] U.S. Cl. ..................................... 280/278; 280/287
[58] Field of Search ....................... 280/278, 287, 638; 301/2.5; 74/594.1, 594.4, 594.7

[56] References Cited

U.S. PATENT DOCUMENTS

| | | | |
|---|---|---|---|
| 599,978 | 3/1898 | Tanner | 74/594.7 |
| 2,283,671 | 5/1942 | Finlay et al. | 280/284 |
| 3,814,462 | 6/1974 | Kelly | 280/287 |
| 4,022,485 | 5/1977 | Cox | 280/287 |
| 4,417,745 | 11/1983 | Shomo | 280/287 |
| 4,421,337 | 12/1983 | Pratt | 280/284 |
| 4,441,729 | 4/1984 | Underwood | 280/287 |

FOREIGN PATENT DOCUMENTS

| | | |
|---|---|---|
| 628783 | 6/1983 | Belgium . |
| 147126 | 12/1903 | Fed. Rep. of Germany . |
| 504805 | 8/1930 | Fed. Rep. of Germany . |
| 808190 | 7/1951 | Fed. Rep. of Germany . |
| 812156 | 8/1951 | Fed. Rep. of Germany . |
| 822347 | 11/1951 | Fed. Rep. of Germany . |
| 1905388 | 7/1964 | Fed. Rep. of Germany . |
| 1810445 | 7/1969 | Fed. Rep. of Germany . |
| 3230624 | 2/1984 | Fed. Rep. of Germany ..... 280/28.1 |
| 3701803 | 1/1987 | Fed. Rep. of Germany . |
| 867505 | 11/1941 | France ................................. 280/278 |
| 415843 | 9/1934 | United Kingdom . |

*Primary Examiner*—Charles A. Marmor
*Assistant Examiner*—Tamara L. Graysay
*Attorney, Agent, or Firm*—Niles, Kurz, Bergert & Tamburro

[57] ABSTRACT

A foldable bicycle having a main frame that supports front and rear wheels that are each connected with the main frame by quick release hub fasteners to enable quick disconnection from the frame of each of the front and rear wheels. The main frame includes a pedal drive bearing housing that rotatably carries a toothed pedal drive wheel that includes drive pedals to enable the rear wheel to be driven through a drive chain that passes over the toothed drive wheel and over a toothed crank wheel coupled with the rear wheel. The rear wheel is supported by a rear wheel support that extends from the main frame and that includes a rear wheel strut and a rear wheel pivot arm that are each pivotally connected with the main frame and that are each separably connected with each other. The rear wheel pivot arm carries the toothed crank wheel, and after the rear wheel strut and the rear wheel pivot arm are disconnected from each other the pivot arm is pivoted about the pedal drive bearing housing with the drive chain and toothed drive wheel attached to the pivot arm, which is pivoted toward the main frame when the bicycle is folded. The rear wheel strut is also pivotable toward the main frame. The drive pedals can be releasably connected with the toothed pedal drive wheel. In an alternative embodiment the rear wheel strut includes a spring damping element.

12 Claims, 3 Drawing Sheets

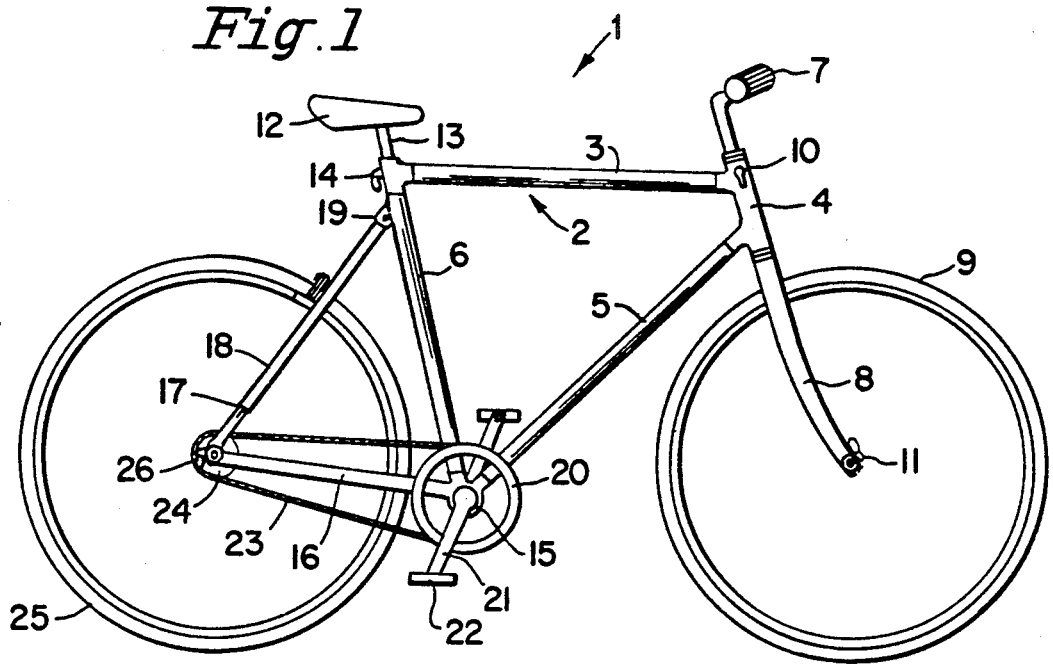
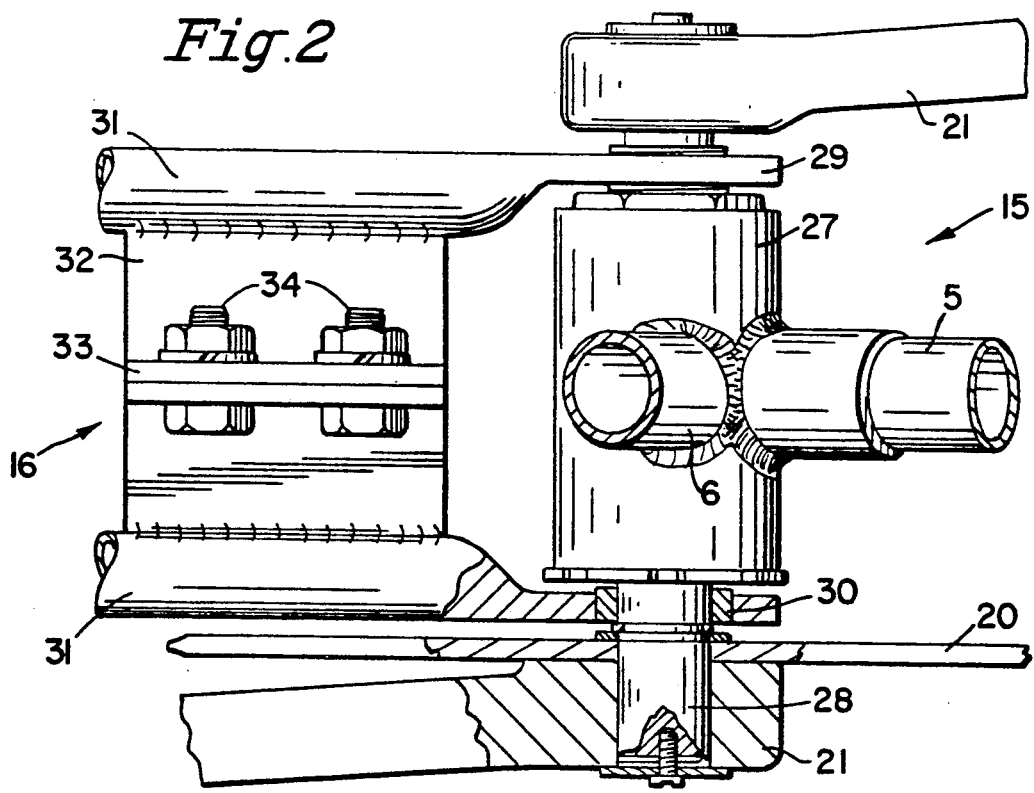

(DETAIL A)

FOLDING BICYCLE

This application is a continuation, of application Ser. No. 07/631,752, filed Dec. 21, 1990 now abandoned which is a continuation of application Ser. No. 07/392,960 filed Jul. 3, 1989 now abandoned.

FIELD OF THE INVENTION

This invention relates to a bicycle with a folding frame.

Background Art

A bicycle is disclosed in German Publication 18 10 445 with a main frame having front and seat pipes. A saddle carried saddle pipe is telescoped to slide in the seat pipe. A pedal drive bearing is arranged in the vicinity of the joint between the front pipe and seat pipe. Further, the removable rear wheel, is held on the main frame by a rear wheel pivot arm in a pivoting bearing coaxial with the pedal drive bearing. This rear wheel pivot arm can be locked in place in its joint beneath the inserted saddle pipe so that the saddle pipe engages the rear wheel pivot arm by means of a latch mechanism on its side. For folding the bicycle the saddle pipe is moved upwardly in the receptacle pipe, so that a lock joint between the saddle pipe and the rear wheel pivot can be released. The rear wheel pivot arm after removal of the rear wheel can then be snapped counter-clockwise in the direction of the saddle pipe.

Satisfactory riding stability while moving straight ahead or while moving in a curve and a satisfactory riding comfort cannot be attained with such construction of a folding bicycle. Heretofore it would be necessary to have a solid joint between the seat pipe and the saddle pipe as well as between the saddle pipe and the rear wheel pivot. Besides, a great effort necessary to pull out the middle pipe from the seat pipe for folding this bicycle. More than that, it is disadvantageous because of the structure requiring high weight as well as the consequential bulkiness of the folding bicycle.

In U.S. Pat. No. 4,441,729 a foldable bicycle is disclosed whose frame has two parts. The front frame part includes the forks for the front wheel with two parallel fork pipes and also two spaced from each other upper frame pipes and two spaced from each other lower frame pipes. The rear frame part includes the saddle pipe on whose lower end is positioned the bearing for pedalling, onto which in turn is fastened the rear wheel mount in turn connected with the upper frame at the saddle pipe to hold the rear wheel braces in place. The rear end of the lower frame tubing adjoining the front wheel part is removably fastened to pivot about the axis of the pedal drive bearing while the upper frame tubing is removably fastened to the upper end of the saddle pipe.

In order to take apart the bicycle, the coupling between the upper frame pipes and the saddle pipe is loosened. Furthermore the saddle is removed from the saddle pipe. When unlocked the rear frame piece can be pivoted clockwise about the pedal bearing axis, so that the rear wheel can be tucked into the spacing between the upper and lower frames. In order for this interengagement to be possible, the front frame must have a wider double frame made so that when ridden by the bicycle rider the inner sides of his thighs and also the knees cannot make contact with the upper frame pipes.

Besides the frame for breaking into parts in the prior art is undesirable for the forward movement in a straight line and about curves. The frame by means of the use of the double pipes withstands little force and can only be made sufficiently stiff and unbreakable by use of high strength materials as well as added braces. One further weakness is the connection of the lower frame pipes to the pedal drive bearing. Here also this connection is a pivotable one, which must be absolutely solid so that unstable running conditions are avoided.

Furthermore, this special construction of a folding bicycle is relatively heavy, has high manufacturing cost and necessarily always is relatively bulky requiring too large a storage space for transport in a trunk.

In the British Patent 415,843 a bicycle frame is shown, which can be folded together for facilitating transport from a producer to the bicycle manufacturer. This frame however cannot be made into a folding bicycle, since the single part of this frame can only disassembled with special tools and besides the place at which these special tools were located for putting together bicycles is no longer available.

Further known are special constructions for foldable bicycles having small specially constructed frames and small wheels. One embodiment is the so called Bickerton bicycle (Frankfurter Allgemeine Zeitung, Oct. 18, 1978, No. 230, Page 34), which is a very small collapsible construction, however because of torsion weakness and insufficient riding quality it only can be regarded as a second bicycle.

A further special construction for bicycles that can be taken apart are the so called Moulton bicycles (Frankfurter Allgemeine Zeitung, Nov. 9, 1987, No. 261, Page 37), which are stiffened by triangular brace construction of the frame and even have springing for the rear and front wheel. However their great value due to labor and costly special construction offer riding performance comparable with sport or racing bicycles. All things considered, this collapsible into two parts bicycle requires a relatively large storage space of about 150 by 80 centimeters.

Other foldable bicycles strive for a customary construction appearance, and also construction with triangular frames or ladies frames with frame height about 60 cm. and wheels with about the same diameter. Examples of these bicycles are described in German Patent 504,805 and German Patent 1,905,388. The partial folding of such bicycles requires considerable trouble because chains, the drive arrangement and rim brakes must be removed for the folding.

One interesting development is written in Zeitschrift Radfahren No. 1, 1989, pages 26ff. Starting from a normal women's bicycle for the forward construction, in the plane of the frame below both frame pipes about the middle of its length a locking brace can be mounted and removed. The necessary chains and light wires in the frame pipes are shifted and provided with couplings and disconnects which detent with the folding bicycle. This construction requires labor intensive manufacture, especially in the vicinity of the disconnects in each frame pipe.

From Belguim patent 628,783 a folding bicycle is known, whose rear wheel pivot swivels about a pivot bearing coaxial with the pedal drive bearing in the direction toward the front wheel fork without removing of the drive apparatus for the rear wheel. The rear wheel is thus swivelled to fold the bicycle, so that the main frame having double pipe frame between the saddle and steering pipes in drawn up for tucking in the rear wheel when folding. However, such a double pipe frame has a relatively large width so that the rider of the bicycle is impeded and even endangered for example through collision with the ankles while pedalling.

The rear construction of this known bicycle consists of the rear wheel pivot and a rear wheel strut bound to the rear end at a small angle, whose forward end is unstable with the saddle pipe of the main frame or is disconnectable for the folding of the bicycle. The disadvantage results in that fixed acute triangle at the rear construction part of the bicycle unfavorably reacts under pressure and bending forces because the rider is thereby much higher on the saddle pipe. The construction of the same bicycle is thereby very weak, so that unfavorable riding quality results. In order for this disadvantage at least to be reduced, the rear construction of this known bicycle need be made very heavy. In order for a necessary stability to be attained it would be possible then only with bracing technology by soldering or welding to add the necessary strengthening. Besides it is not at all possible to repair or to interchange parts except at considerable cost.

In this known bicycle the cables are fastened to the frame pipe running between the steering and saddle pipes and end at the rear wheel strut or requires a disconnect junction or the like at the border with the rear wheel. By the swiveling of the rear end part in the direction toward the steering pipe the cording network cannot be broken, so guiding of the cording is generally troublesome with the required generally hump free requirement of the disconnect joint in the region between the rear wheel strut and the saddle pipe, which would hinder riding. Another deficiency of the cording network, for example, it must not be possible with the foregoing construction to snap off the cording with the pedal drive bearing, so that a practical construction is not therewith possible.

Because of the positioning of these disconnects however, the rear frame part is relatively large so that the arrangement of the taken apart bicycle in the trunk can causes problems. Besides it is only possible to properly take apart the bicycle parts with patience.

SUMMARY OF THE INVENTION

This invention solves the problem of providing a folding bicycle having a frame of size and strength of a bicycle frame of ordinary construction so that the bicycle has good riding qualities. Besides the folding bicycle requires only minimum storage space and the folding and unfolding is simple and quick without working tools. The bicycle should last longer without great expenditure for repairs.

This is achieved by means of a main frame of conventional construction, and a triangular frame for male bicycle riders or a double pipe frame for female riders, in which the rear wheel pivot arm with a combined rear wheel brace strut swing coaxially about the pedal drive bearing on the main frame so that it is detachable from one of the two joints of the rear wheel brace strut, uppermost at the saddle pipe and lowermost at the rear wheel pivot arm. After removal of the rear wheel, the rear wheel pivot arm can swivel in the direction of the front wheel fork for fastening without requiring removal of the chain drive wheel from the pedal drive bearing or the chain drive gear from the rear wheel together with the chain, or removal of a remaining rear wheel drive such as a gear shift drive.

The main frame of a bicycle provided in accordance with the invention has convention wheels of one piece construction which gives the bicycle high basic strength specially at the critical force input points (pedal, drive, saddle). The rear wheel pivot arm preferably circles the pedal drive bearing on both sides, to provide an especially stiff slack free and simply constructed joint. All together this provides the riding qualities of a bicycle according to this invention similar to a conventional sport or racing bicycle.

Because of the simple folding mechanism, a bicycle according to the invention is not materially heavier than a conventional bicycle. The bicycle can be folded without special tools. By swinging the rear wheel pivot arm coaxially about the pedal drive bearing, no change is required in position of the drive means between the pedal drive bearing and rear wheel axle so that with a chain and toothed wheel drive the chain length remains unchanged and also no problems are encountered with gear shift drives. An easily operated lever is mounted on a standard rear wheel hub to simply disconnect the rear wheel, so that the toothed drive wheel, drive mechanism and chain, or the former drive line, remains connected with the rear wheel pivot arm. Accordingly drive lines, for example drive for a rear wheel toothed wheel arrangement, or electric light cords are easily manipulated to accommodate the swinging of the rear wheel pivot about the pedal drive bearing. Further, a multiple gear drive arrangement or a rear wheel rim brake can be used without problems.

Accordingly with the invention, a bicycle is provided hardly differing in size from conventional sport or racing bicycles. Naturally, the same general construction is feasible on bicycles with smaller wheels and frames or with other known specialty construction.

Because of the simplified folding mechanism of the invention, one can store a folded bicycle with normal frame size in a space with dimensions of 80 by 65 cm. This folding bicycle feature permits storage in most automobile trunks without problem. The storage room can be still further reduced if the pedals and the drive crank are fastened with a lock pin, so that without work tools if necessary the drive crank can be moved inwardly. Accordingly the overall reduction of the storage space to a quarter of the unfolded bicycle is attained.

Further advantages of the invention are found hereinafter.

BRIEF DESCRIPTION OF THE DRAWINGS

An embodiment of the invention is illustrated in the drawing. In the drawing:

FIG. 1 is a view of a folding bicycle according to the invention;

FIG. 2 is a partial view in section, of the folding mechanism of a bicycle according to the invention in the region of the pedal drive bearing;

THE PREFERRED EMBODIMENT

Figure 3:
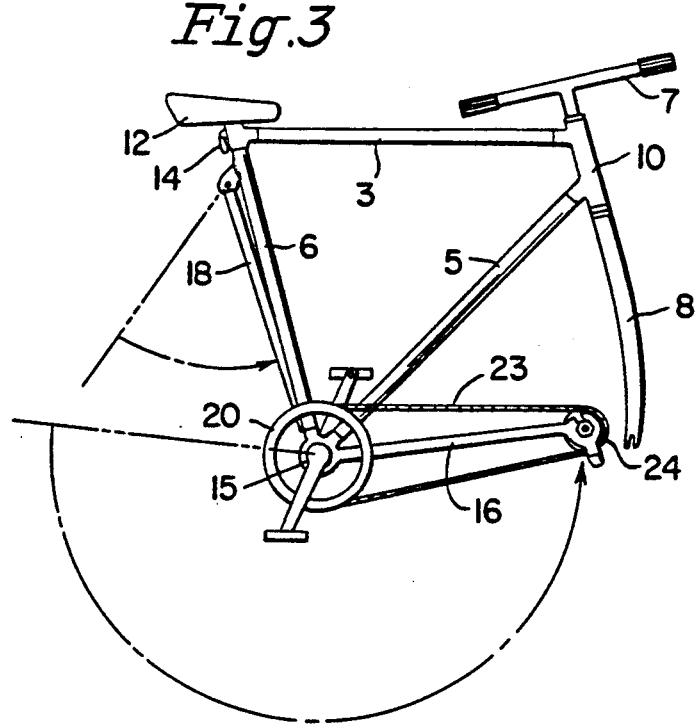
FIG. 3 is a view of the frame in folded position.

In FIG. 1, a male sport bicycle 1 is shown with a stiffening triangular frame 2, having an upper frame pipe 3, a turning pipe 4, a lower frame pipe 5 and a saddle pipe 6. In the turning pipe is mounted in a conventional manner a handlebar 7 and a fork 8 for a front wheel 9. The handlebar 7 is fixed for height and steering with a quick locking mechanism 10. The front wheel 9 is mounted in the fork 8 with an easily releasable hub lock 11.

A saddle 12 is inserted in the saddle pipe 6 with a connecting pipe 13 and the saddle is adjusted in height by a quick locking fastener 14.

The frame pipes 5 and 6 are in a conventional manner welded to a pedal drive bearing 15 which as further described in connection with FIG. 3 is coupled with a rear wheel pivot arm 16. The rear free end of the rear wheel pivot arm 16 is bound by a sliding joint 17 to a rear wheel strut 18, whose other end in the upper region of the saddle pipe 6 is pivotably coupled at 19. The rear wheel support includes the rear wheel strut 18 and rear wheel pivot arm 16.

With the pedal drive bearing 15 is coupled a toothed pedal drive wheel 20 as well as with a drive crank including two drive arms 21 with drive pedals 22. A drive chain 23 runs about the toothed pedal drive wheel to engage a toothed crank wheel 24 of the rear wheel 25, which is fixed at the free end of the rear wheel pivot 16 by means of a quick release hub fastener 26.

Not shown are sheet metal protectors for the front and rear wheels which can be conventionally mounted, nor the lighting and brakes for the front wheel. These parts are assembled in a conventional manner. For brakes on the rear wheel a rim brake 36, 36a is possible.

The pedal drive bearing (FIG. 2) comprises a conventional pedal drive bearing housing 27 to which the frame tubes 5 and 6 are welded. On both sides of the pedal drive bearing housing 27, projecting ends of a pedal drive bearing axle 28 are in turn adjacent an end 29 of the rear wheel pivot arm 16 by means as the case may be of a suitably positioned slide or roller bearing 30. In a conventional fashion (wedge or four-cornered) the pedal drive bearing axle 28 is attached to the toothed pedal drive wheel 20 and to the drive arms 21. The arms 29 are endpieces to the pipes 31 which in this case are two rear wheel pivot arm pipes. These pipes for example carry welded on plates 32 having an upwardly extending flange 33. The adjoining flanges 33 of the respective pipes are bolted together by bolts 34.

In order to bring the bicycle as shown in the riding position of FIG. 1 into the folded position of FIG. 3 the following takes place:

By loosening the quick release hub fasteners 11 and 26 the front and rear wheels respectively are removed. By loosening the fast release clamp 10, the handlebars are shoved into the steering pipe 4 and newly fastened by the fast release clamp 10 with the fork 8 turned about 90° or 180°. Finally the rear wheel pivot arm 16 is swiveled in the direction of the fork 8. To do that the upper end of rear wheel strut 18 at the saddle pipe 19 or the lower strut end at the rear wheel pivot arm 16 is released as seen in FIG. 3. The bicycle folded in this way only requires a third of the necessary room for the bicycle of FIG. 1 in riding position.

Figure 4:
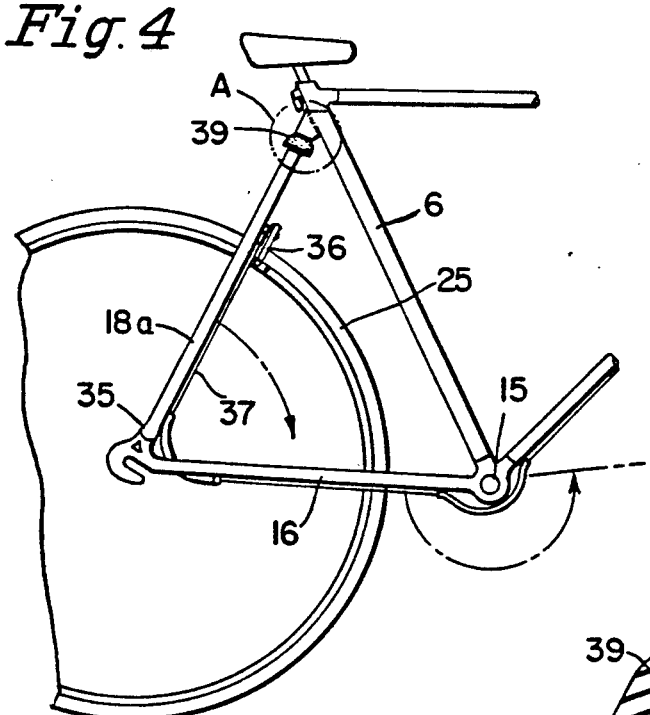
FIG. 4 is a view of the rear wheel for a foldable bicycle according to the invention with a rear wheel spring suspension.
Figure 5:
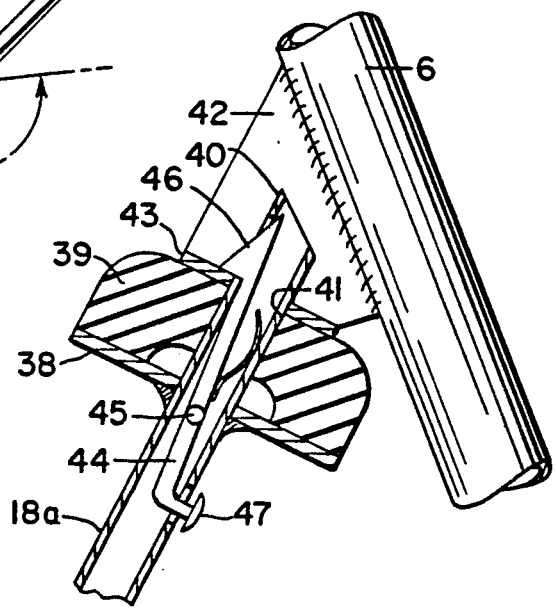
FIG. 5 is a partial detail in section of the spring suspension of the bicycle of FIG. 4.

In FIGS. 4 and 5 of an embodiment is shown in which the rear wheel strut 18a at its fork end 35 is bound with the pivotable rear wheel pivot arm 16. In the upper fork region is also positioned a rim brake 36, whose cable line 37 passes alongside the rear wheel strut 18a to rear wheel pivot arm 16. A support plate 38 is welded on the upper region of the rear wheel strut 18, which retains a shock absorbing block, such as a rubber block 39. The rear wheel strut 18a ends in a point 40 pushed through a bore 41 through the shock absorbing rubber block 39, and a bracket 42 welded to the saddle pipe 6. At this place the rubber block 39 lies against an end plate 43 of the bracket 42. Within the point 40 of the rear wheel strut 18a, a catch 44 pivots about axle 45 whose latch 46 at its extremity engages the end plate 43 of the bracket and thereby holds the rear wheel strut 18a in the shown position. The catch 44 carries on the other side of axle 45 a catch knob 47 which extends through the wall of the pipe of the rear wheel pivotable strut 18a. By pressing this knob the latch connection between the rear wheel strut 18a and bracket 42 can be released. The rear wheel working bumps are reduced and damped by means of rubber block 39.

For folding the bicycle of FIGS. 4 and 5 after removal of the wheel, the catch 44 is operated and the rear wheel pivot link 18a is moved in the direction of the rear wheel pivot arm 16. The rear wheel pivot arm 16 is in turn together with the rear wheel strut 18a swiveled in counter clockwise direction about the pedal drive bearing 15.

Figure 6:
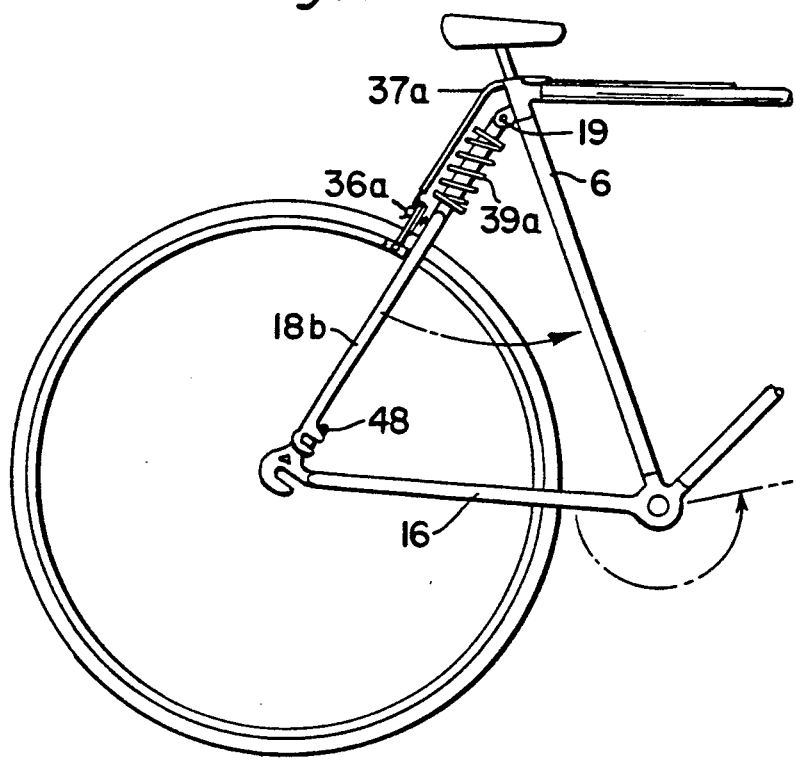
FIG. 6 is a partial view in section of a rear wheel for a foldable bicycle showing a further spring suspension embodiment.

In the embodiment of FIG. 6 a modified rear wheel spring is shown. Here the rear wheel strut 18b as in the FIG. 1 embodiment is connected at 19 to the saddle pipe 6. Both ends of the fork forming portion of the rear wheel struts are connected by a lock pin 48 with the end of the rear wheel pivot arms 16. In the uppper region of the fork the rear wheel pivot arm 18b is inserted a rim brake 36a, whose cording 37a is passed along the rear wheel strut 18b in the direction of the upper frame pipe 3.

In the region between the saddle pipe coupling 19 and the rim brake 36a is inserted a spring damping element into the rear wheel strut. This element can either be a telescoping coil spring 39a or a rubber block shock absorber 39.

In folding the bicycle the lock pin 48 is released, the strut 18b is moved against the saddle tube 6 and finally as aforesaid the rear wheel pivot arm 16 is swivelled in a counterclockwise direction. The saddle as well as the handlebars are positioned with the forks as above said. The folding bicycle attains a storage space with an area hardly greater than one of its wheels.

Figure 7:
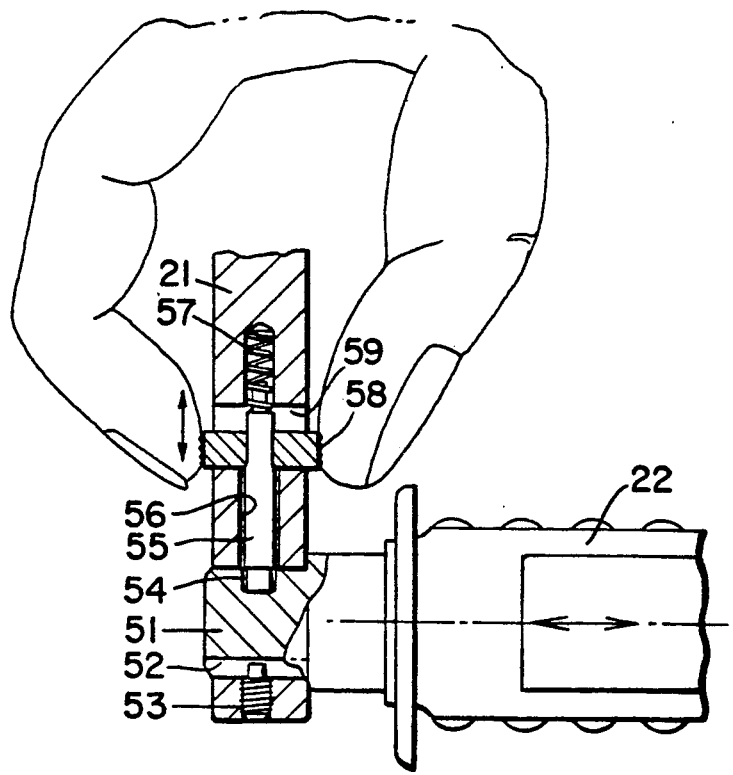
FIG. 7 is a partial view in section of a locking pin arrangement between the drive crank and pedal for a bicycle according to the invention.

For further decreasing the storage space of this folding bicycle and for better handling, the pedals 22 may be unlocked and removed as in FIG. 7. For removal of the pedal 22 each drive arm 21 is equipped with a smooth tip 51 instead of the usual threaded one. The tip 51 has a slot 52 which the set screw 53 of the drive arm engages. The opposite side of the tip 51 has a bore 54 in which a spring biased bolt 55 is held journalled in a longitudinal bore 56 into the drive arm 21. The spring bias is supplied by a cylindrical spring 57. The slide member includes the bolt 55 coupled with a slide bar 58. The bolt 55 projects into a cavity 59 in the drive arm 21. The bolt 55 is held in its rest position by the cylindrical spring 57 so that the pedal 22 is locked in. By pushing back the bolt 55 by means of the slide bar 58 the pin coupling between the drive arm 21 and the pedal 22 is decoupled, and the pedal can be removed from the pedal crank arm. Finally the pedal 22 can be reinserted on the inner side of the drive arm 21.

I claim:

1. A foldable bicycle comprising:
   a. a rigid main frame including a turning pipe for supporting a front fork for pivotal movement relative to the frame, the front fork adapted to rotatably support a front wheel, a pedal drive bearing housing carried by the main frame and spaced from the turning pipe for rotatably supporting a drive crank having a drive crank axis, the drive crank carrying a toothed pedal drive wheel and drive pedals for driving the bicycle, a saddle pipe carried by the main frame and extending from the pedal drive bearing housing for supporting a saddle, and a rear wheel support carried by the main frame and extending from the main frame in a direction opposite from the turning pipe, the rear wheel support connected with the saddle pipe and with the pedal drive bearing housing for rotatably supporting a rear wheel and for rotatably supporting a toothed crank wheel;
   b. a first quick release hub fastener for connecting and disconnecting the front wheel from the front fork;
   c. a second quick release hub fastener for connecting and disconnecting the rear wheel from the rear wheel support;
   d. a drive chain for driving the rear wheel, the drive chain extending around an outer portion of the toothed pedal drive wheel and around an outer portion of the toothed crank wheel;
   e. the rear wheel support including a rear wheel pivot arm having a first end pivotally connected with the pedal drive bearing housing and having a second end supporting the rear wheel and the toothed crank wheel, and a rear wheel strut having a first end pivotally connected with the saddle pipe and having a second end releasably connected with the rear wheel pivot arm at a point adjacent the second end of the rear wheel pivot arm, whereby upon disconnection of the front and rear wheels and disconnection of the second end of the rear wheel strut from the rear wheel pivot arm the rear wheel pivot arm and the toothed crank wheel are pivotable about the pedal drive bearing housing in a direction away from the rear wheel strut and toward the turning pipe, and the rear wheel strut is pivotable about its first end relative to the saddle pipe and toward the pedal drive bearing housing to permit the bicycle to occupy a substantially smaller space when in a folded condition than when the bicycle is in an unfolded condition, to enable the folded bicycle to be conveniently transported.

2. A foldable bicycle in accordance with claim 1, wherein the rear wheel pivot arm pivot axis is coaxial with the drive crank axis.

3. A foldable bicycle in accordance with claim 1, wherein the rear wheel pivot arm carries the toothed crank wheel.

4. A foldable bicycle in accordance with claim 1, wherein the drive pedals are releasably carried by the drive crank.

5. A foldable bicycle in accordance with claim 1, including a pair of releasable connectors carried by the drive crank for releasably supporting the drive pedals, wherein the releasable connectors each include a spring biased slide member received within a bore formed in a respective drive pedal.

6. A foldable bicycle comprising:
   a. a rigid main frame including a turning pipe for supporting a front fork for pivotal movement relative to the frame, the front fork adapted to rotatably support a front wheel, a pedal drive bearing housing carried by the main frame and spaced from the turning pipe for rotatably supporting a drive crank having a drive crank axis, the drive crank carrying a toothed pedal drive wheel and drive pedals for driving the bicycle, a saddle pipe carried by the main frame and extending from the pedal drive bearing housing for supporting a saddle, and a rear wheel support carried by the main frame and extending from the main frame in a direction opposite from the turning pipe, the rear wheel support connected with the saddle pipe and with the pedal drive bearing housing for rotatably supporting a rear wheel and for rotatably supporting a toothed crank wheel;
   b. a first quick release hub fastener for connecting and disconnecting the front wheel from the front fork;
   c. a second quick release hub fastener for connecting and disconnecting the rear wheel from the rear wheel support;
   d. a drive chain for driving the rear wheel, the drive chain extending around an outer portion of the toothed pedal drive wheel and around an outer portion of the toothed crank wheel;
   e. the rear wheel support including a rear wheel pivot arm having a first end pivotally connected with the pedal drive bearing housing and having a second end supporting the rear wheel and the toothed crank wheel, and a rear wheel strut having a first end pivotally connected with the rear wheel pivot arm and having a second end releasably connected with the saddle pipe at a point spaced from the pedal drive bearing housing, whereby upon disconnection of the front and rear wheels from the bicycle and disconnection of the second end of the rear wheel strut from the saddle pipe the rear wheel pivot arm, the toothed crank wheel, and the rear wheel strut are pivotable together about the pedal drive bearing housing in a direction away from the saddle pipe and toward the turning pipe to permit the bicycle to occupy a substantially smaller space when in a folded condition than when the bicycle is in an unfolded condition, to enable the folded bicycle to be conveniently transported.

7. A foldable bicycle in accordance with claim 6, wherein the rear wheel pivot arm pivot axis is coaxial with the drive crank axis.

8. A foldable bicycle in accordance with claim 7 wherein the releasable connection includes a shock absorbing member for absorbing shocks transmitted by the rear wheel strut.

9. A foldable bicycle in accordance with claim 8 wherein the shock absorbing member is a rubber block.

10. A foldable bicycle in accordance with claim 8 wherein the shock absorbing member is a coil spring.

11. A foldable bicycle in accordance with claim 6, wherein the rear wheel pivot arm carries the toothed crank wheel.

12. A foldable bicycle in accordance with claim 6, wherein the drive crank includes a pair of drive arms and each drive arm includes a releasable connector for supporting a drive pedal, wherein the releasable connector of each drive arm includes a spring biased slide member received within a bore formed in the drive pedal.

* * * * *